United States Patent
Maltsev et al.

(10) Patent No.: US 7,333,556 B2
(45) Date of Patent: Feb. 19, 2008

(54) SYSTEM AND METHOD FOR SELECTING DATA RATES TO PROVIDE UNIFORM BIT LOADING OF SUBCARRIERS OF A MULTICARRIER COMMUNICATION CHANNEL

(75) Inventors: Alexander A. Maltsev, Nizhny Novgorod (RU); Ali S. Sadri, San Diego, CA (US); Alexey E. Rubtsov, Nizhny Novgorod (RU); Alexei V. Davydov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 664 days.

(21) Appl. No.: 10/815,035

(22) Filed: Mar. 30, 2004

(65) Prior Publication Data

US 2005/0152465 A1      Jul. 14, 2005

Related U.S. Application Data

(60) Provisional application No. 60/536,071, filed on Jan. 12, 2004.

(51) Int. Cl.
*H04L 27/00* (2006.01)
(52) U.S. Cl. .................................. 375/295; 375/260
(58) Field of Classification Search ............... 375/259, 375/260, 261, 265, 267, 295, 222; 455/452.2, 455/67.11, 67.13; 370/232, 252
See application file for complete search history.

(56) References Cited

U.S. PATENT DOCUMENTS

| | | | |
|---|---|---|---|
| 5,479,447 A | 12/1995 | Chow et al. | |
| 5,668,810 A | 9/1997 | Cannella, Jr. | |
| 6,061,405 A | 5/2000 | Emami | |
| 6,178,158 B1 | 1/2001 | Suzuki et al. | |
| 6,192,026 B1 | 2/2001 | Pollack et al. | |
| 6,249,543 B1 | 6/2001 | Chow | |
| 6,430,441 B1 | 8/2002 | Levine | |

(Continued)

FOREIGN PATENT DOCUMENTS

| | | |
|---|---|---|
| EP | 1240918 A2 | 9/2002 |
| EP | 1411647 A2 | 4/2004 |
| GB | 2384651 | 7/2003 |
| WO | WO-9741675 A1 | 11/1997 |
| WO | WO-03/047198 A2 | 6/2003 |

(Continued)

OTHER PUBLICATIONS

"Supplement to IEEE Standard for Information Technology- Telecommunications and Information Exchange Between Systems- Local and Metropolitan Area Networks—Specific Requirements—Part 11: Wireless LAN Medium Access Control (MAC) and Physical Layer (PHY)", *IEEE STD 802.11A-1999*, (Dec. 30, 1999), c1-90.

(Continued)

*Primary Examiner*—Emmanuel Bayard
(74) *Attorney, Agent, or Firm*—Schwegman, Lundberg & Woessner, P.A.

(57) ABSTRACT

A data rate is selected for subcarriers of each frequency and spatial channel of a slowly varying frequency selective multicarrier channel to provide uniform bit loading (UBL) for faster link adaptation. Signal to noise ratios (SNRs) for subcarriers of the multicarrier communication channel may be calculated from channel state information and a transmit power level. A throughput may be estimated for the data rates from the SNRs and one of the data rates may be selected based on the estimated throughputs.

46 Claims, 3 Drawing Sheets

U.S. PATENT DOCUMENTS

| | | | |
|---|---|---|---|
| 6,748,212 | B2 | 6/2004 | Schmutz et al. |
| 6,795,424 | B1 | 9/2004 | Kapoor et al. |
| 6,891,858 | B1 | 5/2005 | Mahesh et al. |
| 7,020,212 | B1 | 3/2006 | Strait |
| 7,120,198 | B1 | 10/2006 | Dafesh et al. |
| 7,124,193 | B1 | 10/2006 | Leung et al. |
| 2001/0055952 | A1 | 12/2001 | Ficarra |
| 2002/0009155 | A1* | 1/2002 | Tzannes ............... 375/260 |
| 2002/0122383 | A1 | 9/2002 | Wu et al. |
| 2002/0126694 | A1 | 9/2002 | Kahola |
| 2002/0163495 | A1 | 11/2002 | Doynov |
| 2003/0043732 | A1 | 3/2003 | Walton et al. |
| 2003/0083703 | A1 | 5/2003 | Zhu et al. |
| 2003/0119534 | A1 | 6/2003 | Kostic et al. |
| 2003/0139196 | A1 | 7/2003 | Medvedev et al. |
| 2003/0204210 | A1 | 10/2003 | Ousdigian et al. |
| 2003/0208241 | A1 | 11/2003 | Bradley et al. |
| 2004/0018843 | A1 | 1/2004 | Cerwall et al. |
| 2004/0258174 | A1 | 12/2004 | Shao et al. |
| 2005/0031047 | A1 | 2/2005 | Maltsev et al. |
| 2005/0068916 | A1* | 3/2005 | Jacobsen et al. ............ 370/328 |
| 2005/0088959 | A1* | 4/2005 | Kadous ............... 370/208 |
| 2005/0141412 | A1 | 6/2005 | Sadri et al. |
| 2005/0152466 | A1 | 7/2005 | Maltsev et al. |
| 2005/0215264 | A1* | 9/2005 | Subramaniam et al. .. 455/452.2 |
| 2005/0245197 | A1* | 11/2005 | Kadous et al. .......... 455/67.13 |
| 2005/0265281 | A1 | 12/2005 | Ketchum |
| 2005/0276344 | A1 | 12/2005 | Ling et al. |
| 2006/0039312 | A1 | 2/2006 | Walton et al. |
| 2006/0050623 | A1 | 3/2006 | Hartman |
| 2006/0067278 | A1 | 3/2006 | Li et al. |
| 2006/0087972 | A1* | 4/2006 | Jalali et al. ................ 370/232 |

FOREIGN PATENT DOCUMENTS

| | | |
|---|---|---|
| WO | WO-2004/047354 A1 | 6/2004 |
| WO | WO-2005015769 A2 | 2/2005 |
| WO | WO-2005/067171 A1 | 7/2005 |
| WO | WO-2005/071912 A1 | 8/2005 |

OTHER PUBLICATIONS

Abdul Aziz, M. K., et al., "Indoor Throughput and Range Improvements Using Standard Compliant AP Antenna Diversity in IEEE 802.11a and ETSI HIPERLAN/2", *VTC 2001 Fall. IEEE VTS 54th Vehicular Technology Conference*, 2001, vol. 4, (Oct. 7-11, 2001), 2294-2298.

Bangerter, B., et al., "High-Throughput Wireless LAN Air Interface", *Intel® Technology Journal*, 7(3), http://developer.intel.com/technology/itj/index.htm,(Aug. 19, 2003), 47-57.

Choi, B., et al., "Optimum Mode-Switching-Assisted Constant-Power Single- and Multicarrier Adaptive Modulation", *IEEE Transactions on Vehicular Technology*, 52(3), (May 2003), 536-560.

Cioffi, John M., "Chapter 4—Multi-Channel Modulation", *Lectures on Digital Communications, Stanford University*, Available from http://www.stanford.edu/class/ee379c/,(2001), 278-314.

Dammann, A., et al., "Transmit/Receive—Antenna—Diversity Techniques For OFDM Systems", *European Transactions on Telecommunications*, 13(5), Multi-Carrier Spread-Spectrum and Related Topics,(Sep. 2002),531-538.

Fujino, Y., et al., "Transmitter With Antenna Array For MC-CDMA Forward Link", *IEEE Antennas and Propagation Society International Symposium*, (Jun. 22, 2003), 847-850.

Hutter, A. A., et al., "Effects of Fading Correlation on Multiple Antenna Reception Mobile OFDM Systems", *IEEE Vehicular Technology Conference*, (Sep. 24, 2000),2744-2749.

Leke, A., et al., "A Maximum Rate Loading Algorithm for Discrete Multitone Modulation Systems", *GLOBECOM '97, Global Telecommunications Conference*, 1997, vol. 3, (Nov. 8, 1997),1514-1518.

Sandhu, S., et al., "Analog Combining of Multiple Receive Antennas With OFDM", *IEEE International Conference on Communications*, (May 11, 2003),3428-3432.

Simoens, S., et al., "Optimum Performance of Link Adaptation in HIPERLAN/2 Networks", *VTC 2001 Spring. IEEE VTS 53rd Vehicular Technology Conference*, 2001, vol. 2 of 4, (May 6-9, 2001), 1129-1133.

Slimane, B. S., "A Low Complexity Antenna Diversity Receiver For OFDM Based Systems", *IEEE International Conference on Communications*, (Jun. 6, 2001),1147-1151.

Tian, Q., et al., "The Performance of Multi-Carrier CDMA with Base Station Antenna Arrays in fading channels", *Vehicular Technology Conference*, (May 15, 2000),1498-1502.

Yih, C.-H., et al., "Adaptive Modulation, Power Allocation and Control for OFDM Wireless Networks", *Personal, Indoor and Mobile Radio Communication*, 2, (2000),809-813.

Yuan, H., et al., "An Adaptive Array Antenna with Path Selection of OFDM Signal", *European Personal Mobile Communications Conference.*, (Apr. 22, 2003),412-416.

Zhen, L., et al., "A Modified Sub-Optimum Adaptive Bit and Power Allocation Algorithm in Wideband OFDM System", *CCECE 2003 Canadian Conf. on Electrical and Computer Engineering*. vol. 3 of 3, (May 4, 2003),1589-1592.

Bangerter, Boyd, et al., "High-Throughput Wireless LAN Air Interface", *Intel Technology Journal: Wireless Technologies*, 7(3), http://developer.intel.com/technology/itj/index.htm,(Aug. 19, 2003),47-57.

Bansal, Prateek, et al., "Adaptive Loading in MIMO/OFDM Systems", (Dec. 13, 2001) http://web.mit.edu/brzezin/www/359/359.pdf,(Observed Sep. 2003), 12 pgs.

Ergen, M., et al., "QoS Aware Adaptive Subcarrier Allocation in OFDMA Systems", ((Observed Sep. 2003)),26 pgs.

Fischer, R. F., et al., "A New Loading Algorithm for Discrete Multitone Transmission", *Global Telecommunications Conference, 1996. Globecom '96. Communications: The Key to Global Prosperity London*, UK 18-22, vol. 1, (Nov. 18, 1996),724-728.

Jarot, S. P., et al., "Each Carrier Transmission Power Control with Antenna Carrier Diversity for OFDM/DS-CDMA System", *Telecommunications, Eurel Publication*, 11(6), (Nov. 1, 2000),539-546.

\* cited by examiner

| INDEX (208) | DATA RATE (202) | MODULATION (204) | CODE RATE (206) |
|---|---|---|---|
| 1 | 6 | BPSK | 1/2 |
| -- | 8 | BPSK | 2/3 |
| 2 | 9 | BPSK | 3/4 |
| 3 | 12 | QPSK | 1/2 |
| -- | 16 | QPSK | 2/3 |
| 4 | 18 | QPSK | 3/4 |
| 5 | 24 | 16 QAM | 1/2 |
| -- | 32 | 16 QAM | 2/3 |
| 6 | 36 | 16 QAM | 3/4 |
| -- | 30 | 32 QAM | 1/2 |
| -- | 40 | 32 QAM | 2/3 |
| -- | 45 | 32 QAM | 3/4 |
| -- | 36 | 64 QAM | 1/2 |
| 7 | 48 | 64 QAM | 2/3 |
| 8 | 54 | 64 QAM | 3/4 |
| -- | 42 | 128 QAM | 1/2 |
| -- | 56 | 128 QAM | 2/3 |
| -- | 63 | 128 QAM | 3/4 |
| -- | 48 | 256 QAM | 1/2 |
| -- | 64 | 256 QAM | 2/3 |
| -- | 72 | 256 QAM | 3/4 |

SYSTEM AND METHOD FOR SELECTING DATA RATES TO PROVIDE UNIFORM BIT LOADING OF SUBCARRIERS OF A MULTICARRIER COMMUNICATION CHANNEL

CROSS-REFERENCE TO RELATED APPLICATIONS

This application claims the benefit of priority under 35 U.S.C. 119(e) to U.S. Provisional Patent Application Ser. No. 60/536,071, filed Jan. 12, 2004, which is incorporated herein by reference.

TECHNICAL FIELD

Embodiments of the present invention pertain to electronic communication, and in some embodiments, to wireless networks using orthogonal frequency division multiplexed (OFDM) communication signals.

BACKGROUND

Communication stations desirably adapt their communications to changing channel conditions to improve communications in a wireless network. One problem with some conventional communication stations is that a significant amount of feedback between a receiving station and a transmitting station is generally required to optimize channel throughput. This feedback consumes channel bandwidth and requires significant processing by the communication station. Thus there are general needs for communication stations and methods for adapting to channel conditions with less feedback.

BRIEF DESCRIPTION OF THE DRAWINGS

The appended claims are directed to some of the various embodiments of the present invention. However, the detailed description presents a more complete understanding of embodiments of the present invention when considered in connection with the figures, wherein like reference numbers refer to similar items throughout the figures and:

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of embodiments of the invention encompasses the full ambit of the claims and all available equivalents of those claims. Such embodiments of the invention may be referred to, individually or collectively, herein by the term "invention" merely for convenience and without intending to voluntarily limit the scope of this application to any single invention or inventive concept if more than one is in fact disclosed.

Figure 1:
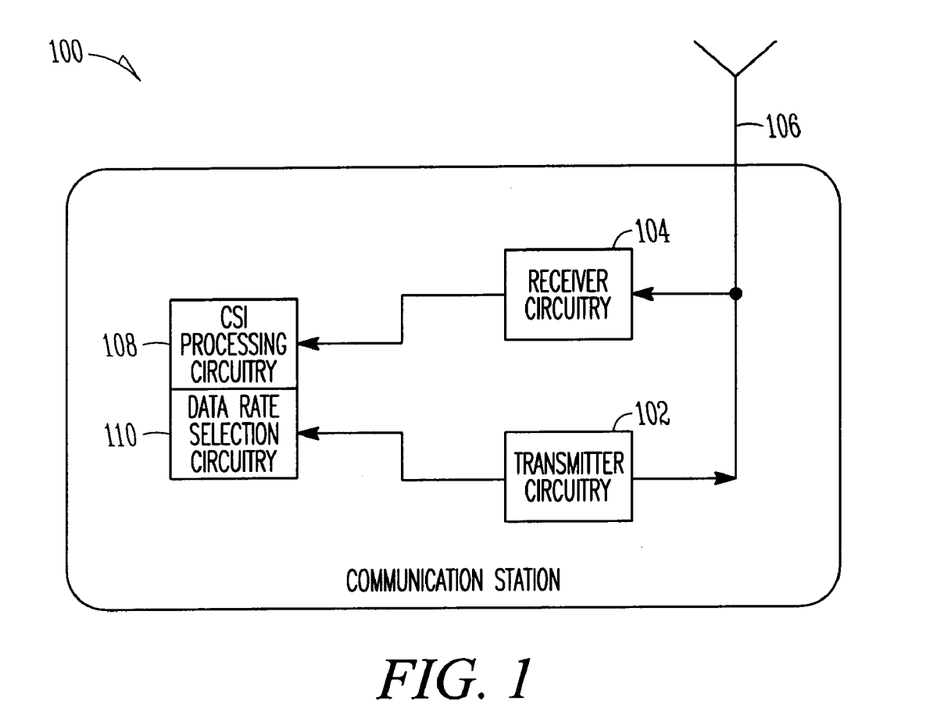
FIG. 1 is a block diagram of a communication station in accordance with some embodiments of the present invention.

FIG. 1 is a block diagram of a communication station in accordance with some embodiments of the present invention. Communication station 100 may be a wireless communication device and may transmit and/or receive wireless communications signals with transmitter circuitry 102 and/or receiver circuitry 104 using one or more antennas 106. In some embodiments, communication station may communicate multicarrier signals, such as orthogonal frequency division multiplexed (e.g., OFDM) communication signals, with one or more other communication stations as described in more detail below.

In some embodiments, communication station 100 may be referred to as a receiving station, and in some embodiments, communication station 100 may be referred to as a transmitting station. The term transmitting station refers to the station that is to transmit payload data, while the term receiving station refers to the station that is to receive the payload data. In general, both transmitting and receiving stations may transmit and receive packets.

In accordance with embodiments of the present invention, communication station 100 may select a data rate for communications with another communication station to provide uniform bit loading (UBL) for faster link adaptation. In these embodiments, channel state information (CSI) processing circuitry 108 calculate momentary signal to noise ratios (SNRs) for subcarriers of a multicarrier communication channel from a transmit power level and channel state information. Data rate selection circuitry 110 may estimate a throughput for each of several possible data rates from the SNRs and may select one of the data rates based on the estimated throughputs. In some embodiments, data rate selection circuitry 110 may select one of the data rates based on the estimated throughputs and predicted packet error ratios (PERs), discussed in more detail below.

In some embodiments, data rate selection circuitry 110 may select one of the data rates from a combination of modulations and code rates associated with a highest of the estimated throughputs for a target PER, although the scope of the present invention is not limited in this respect.

In some embodiments, data rate selection circuitry 110 may predict PERs from the SNRs for each of the possible data rates and may estimate the throughput for each data rate from the predicted PERs. In some embodiments, data rate selection circuitry 110 may predict PERs using SNR performance curves for the data rates to determine a PER for each data rate. The SNR performance curves may be predetermined and stored in a memory of communication station 100, although the scope of the present invention is not limited in this respect.

In some embodiments, data rate selection circuitry 110 may calculate a bit-error rate (BER), based on a known modulation of the current packet. In some of these embodiments, data rate selection circuitry 110 may determine a PER for each of the data rates based on a predetermined (i.e., a known) BER performance of the decoder used by the receiver circuitry 104, the calculated BER, and/or a length of the current packet. In some other of these embodiments, data rate selection circuitry 110 may determine a PER for each of the data rates based on a predetermined symbol error rate (SER), the calculated BER and a length of the current packet. The SER may be based on performance curves, although the scope of the invention is not limited in this respect.

In some embodiments, data rate selection circuitry 110 may estimate a throughput for each possible data rate by multiplying an associated one of the data rates by one minus the PER predicted for that data rate. This is described in more detail below.

In some embodiments, data rate selection circuitry 110 may select one of the data rates from a target PER using estimates of a mean and variance (M/V) adaptation of subcarrier SNRs for the current channel realization. In these embodiments, fast link adaptation is based on estimates of the mean and variance of subcarrier gains. In some embodiments, the M/V adaptation may be performed by calculating a mean channel power gain for each channel realization, calculating a variance of the normalized channel realization, and calculating suitable SNRs for supported data rates. In these embodiments, the M/V adaptation may also include comparing a current SNR averaged over the subcarriers for the current channel realization with predicted SNRs and choosing a suitable data rate. In these embodiments, the use of mean and variance (M/V) adaptation takes into account the variance of a frequency-selective channel, allowing a given PER system performance to be obtained for different channel realizations. In some embodiments, selecting the data rate may depend on the link adaptation strategy (e.g. throughput maximization or throughput maximization under PER constraints).

In some embodiments, the mean channel power gain (M) may be calculated using the following equation:

$$M = \frac{1}{N_{sc}} \sum_{k=1}^{N_{sc}} \lambda(k)$$

In this equation, $N_{SC}$ is number of data subcarriers, k is a subcarrier index of the data subcarriers, and $\lambda$ refers to the particular subcarrier.

In some embodiments, the variance of the normalized channel realization (K) may be calculated using the following equation:

$$K = \frac{1}{M(N_{sc}-1)} \sum_{k=1}^{N_{sc}} \left( \sqrt{\lambda(k)} - \frac{1}{N_{sc}} \sum_{j=1}^{N_{sc}} \sqrt{\lambda(j)} \right)^2$$

In this equation, $N_{SC}$ is number of data subcarriers, k is a subcarrier index of the data subcarriers, and $\lambda$ refers to the particular subcarrier.

In some embodiments, suitable SNRs may be calculated for supported data rates may be calculated using the following equation:

$$SNR_i^{predicted} = f_i(K)$$

In this equation, i refers to the data rate index, and $f_i(x)$—is a function describing the dependence between channel variance and desired SNR.

Figure 2:
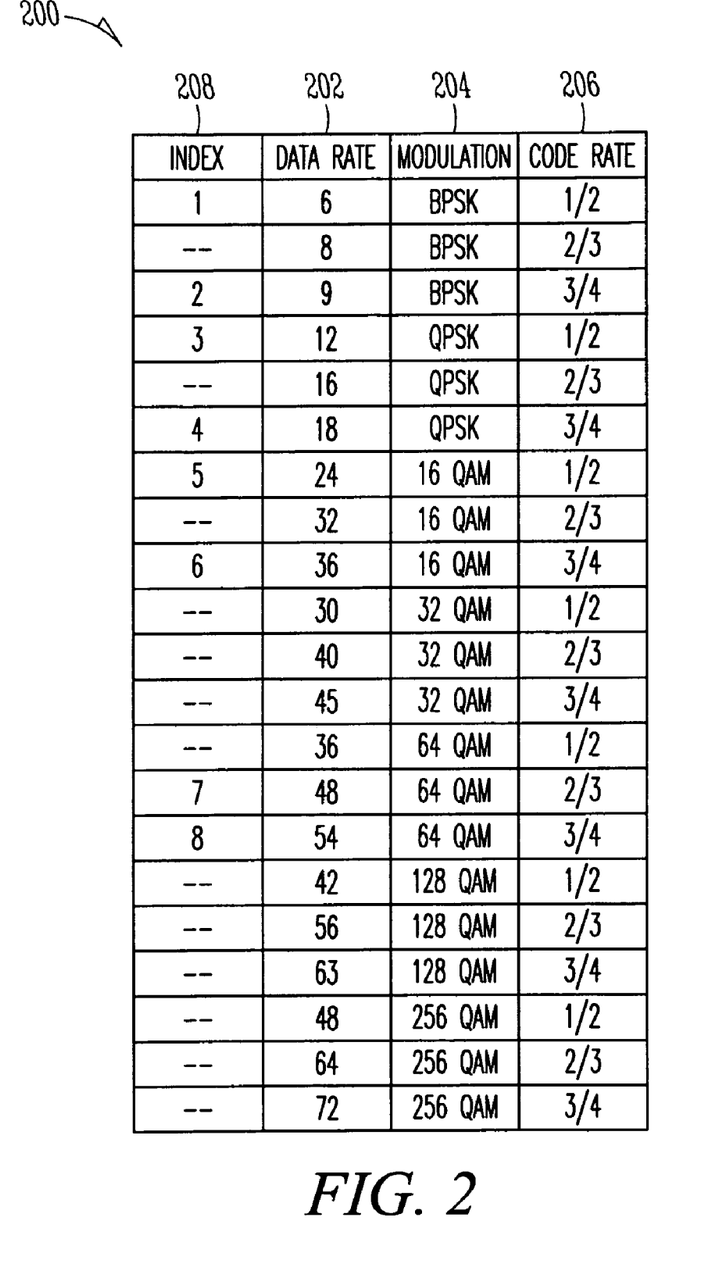
FIG. 2 is a data rate table in accordance with some embodiments of the present invention.

FIG. 2 is a data rate table in accordance with some embodiments of the present invention. Column 202 of table 200 lists examples of possible data rates (in bits per second), column 204 lists modulation types and column 206 lists forward error correction (FEC) code rates. For any particular row, the data rate of column 202 may correspond with the associated modulation and code rate of columns 204 and 206 respectively. In some embodiments, data rate selection circuitry 110 (FIG. 1) may use the following expression to estimate a throughput for each possible data rate based on the predicted PER value for each data rate:

$$Throughput_i \approx RATE_i*(1-PER_i),$$

In this expression, i represents an index of the data rate, examples of which are listed in column 208. In some embodiments, more or fewer data rates than those illustrated in table 200 with indices in column 308 may be assigned an index and throughputs may be calculated. The data rates that are assigned indices are examples of possible data rates selected that may be used in calculating throughput. In some embodiments, other data rates may be assigned indices, and there is no requirement that only 8 indices are used.

Referring back to FIG. 1, in some embodiments, data rate selection circuitry 110 may generate a data rate instruction for use by transmitter circuitry of another communication station. The data rate instruction may include the selected modulation and code rate.

In some embodiments, channel state information processing circuitry 108 and data rate selection circuitry 110 may perform the operations discussed herein as part of a receiving station (e.g., communication station 100). In these embodiments, channel state information processing circuitry 108 may calculate the subcarrier SNRs for a transmit power level provided by a transmitting station (e.g., a station other than communication station 100) in a current packet. In other embodiments, channel state information processing circuitry 108 may calculate the subcarrier SNRs for other available transmit power levels which may be supported by a transmitting station in the next packets. The current packet may be a request to send (RTS) packet, although the scope of the present invention is not limited in this respect. In these embodiments, channel state information processing circuitry 108 may determine the channel state information from channel estimates and noise power estimates performed on the RTS packet. Data rate selection circuitry 110 may estimate throughputs, select the data rate and generate a data rate and transmit power level instructions for a next packet. In these embodiments, transmitter circuitry 102 may be used to send the data rate instructions to the transmitting station in another packet, such as a clear-to-send (CTS) packet. In response to the CTS packet, the transmitting station may transmit at least portions of a data packet (e.g., a packet having a data portion) to communication station 100 in accordance with the data rate and transmit power level instructions.

In some other embodiments, channel state information processing circuitry 108 and data rate selection circuitry 110 may perform the operations discussed herein as part of a transmitting station. In these embodiments, a receiving station (e.g., a station other than communication station 100) may provide the transmitting station (e.g., communication station 100) with channel state information in feedback packet, for example. In these embodiments, channel state information processing circuitry 108 may calculate the subcarrier SNRs based on a transmit power level (known by the transmitting station) and the provided channel state information. Data rate selection circuitry 110 may estimate throughputs, select the data rate and generate a data rate instruction. In these embodiments, transmitter circuitry 102 of communication station 100 may transmit at least portions of a data packet (e.g., a packet having a data portion) to the receiving station in accordance with the data rate instruction determined therein.

In some embodiments, communication station 100 may communicate with one or more other communication stations over a multicarrier communication channel, such as an OFDM communication channel. The multicarrier communication channel may be a slowly varying frequency selective channel, although the scope of the invention is not limited in this respect. The multicarrier channel may comprise one or more subchannels. The subchannels may be frequency-division multiplexed (i.e., separated in frequency) and may be within a predetermined frequency spectrum. The subchannels may comprise a plurality of orthogonal subcarriers. In some embodiments, the orthogonal subcarriers of a subchannel may be closely spaced OFDM subcarriers. To achieve orthogonality between closely spaced subcarriers, in some embodiments, the subcarriers of a particular subchannel may have a null at substantially a center frequency of the other subcarriers of that subchannel. In some embodiments, the subcarriers of a subchannel may have a spacing therebetween of between 300 and 400 kHz, although the scope of the invention is not limited in this respect.

In some embodiments, the multicarrier communication channel may comprise either a standard-throughput channel or a high-throughput communication channel. In these embodiments, the standard-throughput channel may comprise one subchannel and the high-throughput channel may comprise a combination of one or more subchannels and one or more spatial channels associated with each subchannel. Spatial channels are non-orthogonal channels (in terms of frequency) associated with a particular subchannel. In these embodiments, CSI processing circuitry 108 may calculate momentary SNRs for each subcarrier of the one or more subchannels and the one or more spatial channels comprising the multicarrier communication channel from the current and/or available transmit power level and the channel state information. In these embodiments, the data rate and transmit power level instructions may include a selected modulation type, a selected code rate and a transmit power allocation for each of the one or more subchannels and/or each of the one or more spatial channels comprising the multicarrier communication channel. In these embodiments, channel state information processing circuitry 110 may determine the channel state information including noise power estimates and a channel transfer function for each subcarrier of the one or more spatial channels and the one or more subchannels. The channel transfer function may define the frequency and/or time characteristics of the channel.

In some embodiments, a high-throughput communication channel may comprise a wideband channel having up to four frequency separated subchannels, a multiple-input-multiple-output (MIMO) channel comprising a single subchannel having up to four spatial subchannels, or a wideband-MIMO channel comprising two or more frequency separated subchannels where each subchannel has two or more spatial channels. In these embodiments, a wideband channel may have a wideband channel bandwidth of up to 80 MHz and may comprise up to four of the subchannels, although the scope of the invention is not limited in this respect. The subchannels may have a subchannel bandwidth of approximately 20 MHz, although the scope of the invention is not limited in this respect.

In some embodiments, communication station 100 may comprise more than one of antennas 106 to communicate over more than one spatial channel within a subchannel. In these embodiments, the multicarrier communication channel may be a high-throughput communication channel.

In some embodiments, receiver circuitry 104 may comprise a plurality of subcarrier demodulators to demodulate the subcarriers of the multicarrier channel that were modulated in accordance with modulations comprising at least some of binary phase shift keying (BPSK), quadrature phase shift keying (QPSK), 8PSK, 16-quadrature amplitude modulation (16-QAM), 32-QAM, 64-QAM, 128-QAM, and 256-QAM. In these embodiments, receiver circuitry 104 may also include decoding circuitry, such as a convolutional decoder to decode bit streams encoded with forward error correction (FEC) code rates of ½, ⅔, and ¾, although the scope of the invention is not limited in this respect.

In some embodiments, data rate selection circuitry 110 may select various data rates (i.e., bit distributions) comprising various modulations and code rates for each of the subcarriers of the multicarrier communication channel based on the SNR for the associated subcarrier. In some embodiments, the bit distributions may be based on a bit loading per subcarrier in accordance with an adaptive bit loading (ABL) technique in which a modulation may be selected for each subcarrier based on the channel conditions of that subcarrier. In these embodiments, data rate selection circuitry 110 may calculate throughput estimate for each of the one or more spatial channels and/or each of the one or more subchannels for the multicarrier communication channel. Data rate selection circuitry 110 may further select a data rate for all data subcarriers of each of the one or more spatial channels and/or each of the one or more subchannels of the multicarrier communication channel based on the calculated throughput estimates.

In some embodiments, data rate selection circuitry 110 may determine an upper and a lower data rate based on the sum of the subcarrier throughputs (the sum of the bits distributed over subcarriers). In some embodiments, data rate selection circuitry 110 may determine the possible data rates just above and just below the sum of the subcarrier throughputs. In some embodiments, data rate selection circuitry 110 may calculate a first number of subcarriers with throughputs higher than the upper data rate, and may calculate a second number of subcarriers with throughputs lower than the lower data rate. Data rate selection circuitry 110 may then select the upper data rate when a difference between the first and second numbers is greater than a predetermined percentage (e.g., 25%) of the subcarriers comprising the multicarrier communication channel. The lower data rate may be selected when the difference between the first and second numbers is not greater than the predetermined percentage of the subcarriers. In some embodiments, the predetermined percentage may range between 0% and 60%, although the scope of the invention is not limited in this respect.

In some other embodiments, data rate selection circuitry 110 may calculate a subcarrier capacity for each possible data rate based on the SNR calculated for each subcarrier of the multicarrier communication channel. Data rate selection circuitry 110 may refrain from estimating the throughput for each of the data rates, and may select one of the possible data rates of the plurality based on a sum of the subcarrier capacities. In some embodiments, data rate selection circuitry 110 may select a possible data rate closest to the sum of the subcarrier capacities. In these embodiments, data rate selection circuitry 110 may calculate the subcarrier capacity for each subcarrier substantially by multiplying a subcarrier frequency spacing ($\Delta F$) by a logarithm of one plus the SNR for the associated subcarrier divided by a predetermined subcarrier SNR gap ($\Gamma$). The predetermined subcarrier SNR gap ($\Gamma$) may represent a predetermined SNR gap or SNR margin representing how far a practical communication station may be from achieving a theoretical capacity, although the scope of the present invention is not limited in this respect. In some embodiments, the subcarrier capacity of each of the subcarrier may be calculated substantially from the following expression:

$$\text{Subcarrier Capacity}_i = \Delta F * \log_2(1 + SNR_i/\Gamma)$$

In this expression, i represents a subcarrier index, $\Delta F$ represents a subcarrier frequency spacing, and SNRi represents the SNR of the ith subcarrier.

In some embodiments, data rate selection circuitry 110 may determine an upper and a lower data rate based on the sum of the subcarrier capabilities. In some embodiments, data rate selection circuitry 110 may determine the possible data rates (i.e., from column 202 of table 200) just above and just below the sum of the subcarrier capacities. In some embodiments, data rate selection circuitry 110 may calculate a first number of subcarriers with capacities higher than the upper data rate, and may calculate a second number of subcarriers with capacities lower than the lower data rate. Data rate selection circuitry 110 may then select the upper data rate when a difference between the first and second numbers is greater than a predetermined percentage (e.g., 25%) of the subcarriers comprising the multicarrier communication channel. The lower data rate may be selected when the difference between the first and second numbers is not greater than the predetermined percentage of the subcarriers. In some embodiments, the predetermined percentage may range between 20% and 60%, although the scope of the invention is not limited in this respect.

In some embodiments, each of the subchannels may have up to 48 or more orthogonal data subcarriers, and the subcarriers may have a spacing therebetween of approximately 312.5 kHz, although the scope of the invention is not limited in this respect. In some embodiments, the frequency spectrums for a multicarrier communication channel may comprise subchannels in either a 5 GHz frequency spectrum or a 2.4 GHz frequency spectrum. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable.

Communication station 100 may be a personal digital assistant (PDA), a laptop or portable computer with wireless-networking communication capability, a web tablet, a wireless telephone, a wireless headset, a pager, an instant messaging device, a digital camera, an access point or other device that may receive and/or transmit information wirelessly. In some embodiments, communication station 100 may transmit and/or receive radio-frequency (RF) communications in accordance with specific communication standards, such as the Institute of Electrical and Electronics Engineers (IEEE) standards including IEEE 802.11 (a), 802.11 (b), 802.11 (g/h), 802.11 (n) and/or 802.16 standards for wireless local area networks, although in other embodiments, communication station 100 may also be suitable to transmit and/or receive communications in accordance with other techniques including the Digital Video Broadcasting Terrestrial (DVB-T) broadcasting standard, and the High performance radio Local Area Network (HiperLAN) standard.

Antennas 106 may comprise one or more directional or omnidirectional antennas, including, for example, dipole antennas, monopole antennas, loop antennas, microstrip antennas, patch antennas, slot antennas or other type of antennas suitable for reception and/or transmission of the signals within the spectrum communication channel.

As used herein, channel state information may comprise one or more of a channel transfer function, or estimate thereof, one or more RF signal characteristics, and/or one or more channel quality parameters. In some embodiments, channel state information may include a channel transfer function estimate in the frequency or time domain. In some embodiments, channel state information may include one or more RF channel performance indicators such as SNR, signal-to-interference and noise ratio (SINR), a received signal strength indication (RSSI), and the like. In some embodiments, channel state information may also include one or more channel quality parameters associated with information decoded from a received signal.

Although communication station 100 is illustrated as having several separate functional elements, one or more of the functional elements may be combined and may be implemented by combinations of software-configured elements, such as processing elements including digital signal processors (DSPs), and/or other hardware elements. For example, the circuitry illustrated may comprise processing elements which may comprise one or more microprocessors, DSPs, application specific integrated circuits (ASICs), and combinations of various hardware and logic circuitry for performing at least the functions described herein.

Figure 3:
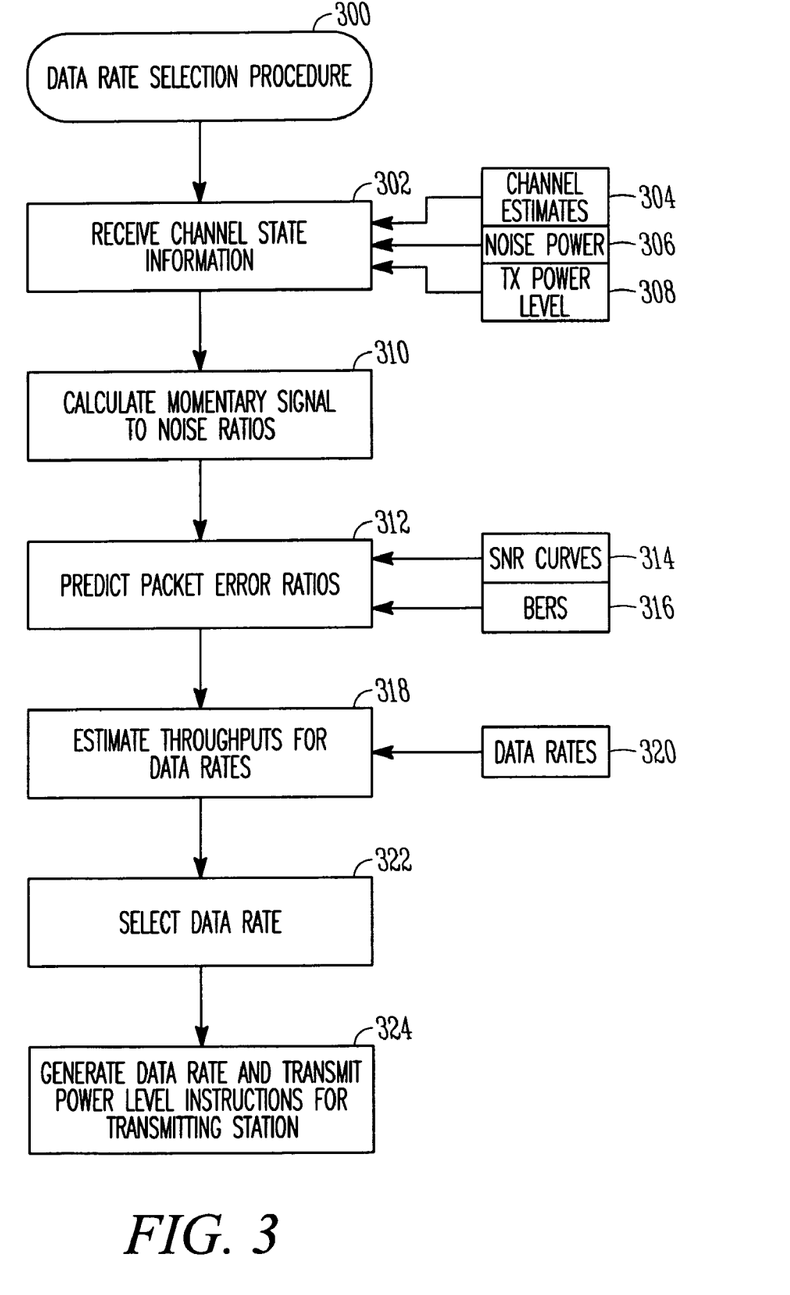
FIG. 3 is a flow chart of a data rate selection procedure in accordance with some embodiments of the present invention.

FIG. 3 is a flow chart of a data rate selection procedure in accordance with some embodiments of the present invention. Data rate selection procedure 300 may be performed by a communication station, such as communication station 100 (FIG. 1), although other communication stations may also be suitable for performing procedure 300. In some embodiments, data rate selection procedure 300 may select a data rate for subcarriers a subchannel comprising of a standard-throughput channel. In other embodiments, data rate selection procedure 300 may select a data rate for subcarriers each subchannel and/or each spatial channel comprising of a high-throughput channel. The data rates selected by procedure 300 may provide a uniform bit loading for faster link adaptation. In some embodiments, procedure 300 may be performed by a receiving station to generate data rate and transmit power level instructions for use by a transmitting station in transmitting a subsequent packet to the receiving station. In some other embodiments, procedure 300 may be performed by a transmitting station for use in transmitting a subsequent packet to a receiving station.

Operation 302 comprises receiving channel state information. In some embodiments, the channel state information may be generated by a receiving station from channel estimates 304, noise power estimated 306 and a transmit power level 308. In some embodiments, transmit power levels may be provided to the receiving station in a current packet sent by the transmitting station. In some embodiments, when procedure 300 is performed by a transmitting station, operation 302 may further comprise the receiving station sending the transmitting station the channel state information in a feedback packet. In some embodiments, the channel state information generated in operation 302 may be generated by channel state information processing circuitry 108 (FIG. 1) of a receiving station, although the scope of the invention is not limited in this respect.

Operation 310 comprises calculating momentary signal to noise ratios (SNRs) for subcarriers of the multicarrier communication channel from the transmit power level and the channel state information from operation 302. In some embodiments, operation 310 may be performed by data rate selection circuitry 110 (FIG. 1), although the scope of the invention is not limited in this respect.

In some embodiments, operation 312 is performed. Operation 312 comprises predicting packet error ratios (PERs) from the SNRs for each of the data rates. In some embodiments, operation 312 comprises using SNR performance curves 314 for the data rates to determine a PER for each data rate. The SNR performance curves may be predetermined and may be stored in a memory of the communication station. In some other embodiments, operation 312 may comprise after demapping bits of a current packet, calculating bit-error rates (BERs) 316 based on a known modulation of the current packet (e.g., an RTS packet), and after decoding the bits of the current packet, determining a PER for each data rate based on a predetermined BER performance of a decoder, the calculated BER, and a length of the current packet. In some embodiments, operation 312 may be performed by data rate selection circuitry 110 (FIG. 1), although the scope of the invention is not limited in this respect.

Operation 318 comprises estimating a throughput for each of a plurality of data rates from the SNRs. In some embodiments, operation 318 may comprise estimating the throughput for each data rate by multiplying an associated one of the data rates by one minus the PER predicted for the associated data rate. In some embodiments, operation 318 may be performed by data rate selection circuitry 110 (FIG. 1), although the scope of the invention is not limited in this respect.

Operation 322 comprises selecting one of the data rates based on the estimated throughputs. In some embodiments, operation 322 may comprise selecting a combination modulations and code rates determined to provide a highest of the estimated throughputs. Examples of modulations and code rates associated with data rates are illustrated in table 200 (FIG. 2). When operation 312 is performed, operation 322 may comprise estimating a throughput for each of the data rates from the predicted PERs.

Operation 324 comprises generating data rate and transmit power level instructions for a transmitting station. The data rate instruction may include the selected modulation type and code rate. In some embodiments, operation 324 may be performed by data rate selection circuitry 110 (FIG. 1), although the scope of the invention is not limited in this respect.

In some embodiments, operation 302 may be performed by a receiving station based on a known transmit power level provided by the transmitting station in a current packet. The known transmit power level refers to the transmit power level of the current packet as well as available transmit power levels that the transmitting station may use. The current packet may be a request to send (RTS) packet. In these embodiments, the receiving station may determine the channel state information from channel estimates and noise power estimates performed on the RTS packet. After operation 324, the receiving station may send the data rate and transmit power level instructions to a transmitting station in a clear-to-sent (CTS) packet, and the transmitting station to responsively transmit at least portions of a data packet to the receiving station in accordance with the data rate instruction.

In some embodiments, the multicarrier communication channel may comprise either a standard-throughput channel or a high-throughput communication channel. In these embodiments, the standard-throughput channel may comprise one subchannel and the high-throughput channel may comprising a combination of one or more subchannels and/or one or more spatial channels associated with each subchannel. In these embodiments, operation 310 may comprise calculating momentary SNRs for each subcarrier of the one or more subchannels and/or the one or more spatial channels comprising the multicarrier communication channel from the transmit power level and the channel state information. In these embodiments, operation 324 may comprise generating a data rate instruction to include a selected modulation type, a selected code rate and transmit power allocation for each of the one or more subchannels and/or each of the one or more spatial channels comprising the multicarrier communication channel. In these embodiments, operation 302 may comprise determining the channel state information including noise power estimates and a channel transfer function for each subcarrier of the one or more spatial channels and/or the one or more subchannels of the multicarrier communication channel.

In some embodiments, transmit power may be allocated to subchannels and/or spatial channels of a high-throughput multicarrier communication channel in accordance with a power allocation algorithm. The power allocation algorithm may use SNR, PER, BER and/or other capabilities of the subchannels and/or spatial channels to allocate transmit power to the subcarriers.

In some other embodiments, operation 318 may comprise selecting various data rates (bit distributions) comprising various modulations and code rates for each of the subcarriers of the multicarrier communication channel based on the SNR for the associated subcarrier and calculating throughputs for each of the one or more spatial channels and/or each of the one or more subchannels of the multicarrier communication channel. In these other embodiments, operation 322 may comprise selecting a data rate for the subcarriers of each of the one or more spatial channels and/or each of the one or more subchannels of the multicarrier communication channel.

In accordance with other embodiments, operation 310 may further comprise calculating a subcarrier capacity for each of the data rates based on the SNR calculated in operation 310 for an associated one of the subcarriers. In these embodiments, operations 322 may comprise selecting one of the data rates based on a sum of the subcarrier capacities. In these embodiments, the subcarrier capacity for each subcarrier may be calculated by multiplying a subcarrier frequency spacing ($\Delta F$) by a logarithm of one plus the SNR for the associated subcarrier divided by a predetermined subcarrier SNR gap ($\Gamma$). In these embodiments, operation 322 may comprise determining an upper and a lower data rate based on the sum of the subcarrier capabilities, calculating a first number of subcarriers with capacities higher than the upper data rate, and calculating a second number of subcarriers with capacities lower than the lower data rate. In these embodiments, operation 322 may also comprise selecting the upper data rate when a difference between the first and second numbers is greater than a predetermined percentage of the subcarriers comprising the multicarrier communication channel. Otherwise, the lower data rate may be selected.

Although the individual operations of procedure 300 are illustrated and described as separate operations, one or more of the individual operations may be performed concurrently, and nothing requires that the operations be performed in the order illustrated. Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices.

Some embodiments of the present invention may be implemented in one or a combination of hardware, firmware and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention lies in less than all features of a single disclosed embodiment. Thus the following claims are hereby incorporated into the detailed description, with each claim standing on its own as a separate preferred embodiment.

What is claimed is:

1. A method of selecting a data rate of a multicarrier communication channel comprising a plurality of individual orthogonal subcarriers, the method comprising:
   calculating signal to noise ratios (SNRs) for the individual subcarriers of the multicarrier communication channel from channel state information and a transmit power level;
   calculating a subcarrier capacity for the individual subcarriers from the SNRs;
   estimating a throughput for the multicarrier communication channel for each of a plurality of data rates from a sum of the individual subcarrier capacities and a predicted packet error ratio (PER) for each of the data rates; and
   selecting one of the data rates based on the estimated throughputs,
   wherein for a subsequent transmission, the individual subcarriers are to have a uniform modulation and code rate based on the selected data rate.

2. The method of claim 1 wherein selecting one of the data rates comprises:
   initially selecting one of the data rates based on a combination of one of a plurality of modulations and one a plurality of code rates associated with a highest of the estimated throughputs;
   selecting a next higher data rate when a predetermined percentage of the individual subcarriers have capacities greater than the initially selected data rate; and
   selecting a next lower data rate when a predetermined percentage of the individual subcarriers have capacities lower than the initially selected data rate.

3. The method of claim 2 further comprising predicting packet error ratios (PERs) from the SNRs for each of the data rates, and
   wherein the estimating the throughput comprises estimating a throughput for each of the data rates from the predicted PERs.

4. The method of claim 3 wherein predicting the PERs comprises using SNR performance curves for the plurality of data rates to determine a PER for each data rate, the SNR performance curves being predetermined and stored in a memory of a receiving station.

5. The method of claim 3 wherein the predicting PERs comprises:
   after demapping bits of a current packet, calculating a bit-error rate (BER), based on a modulation of the current packet; and
   after decoding the bits of the current packet, determining a PER for each of the plurality of data rates based on a predetermined BER performance of a decoder, the calculated BER, and a length of the current packet.

6. The method of claim 3 wherein the estimating the throughput comprises estimating a throughput for each data rate of the plurality by multiplying an associated one of the data rates by one minus the PER predicted for the associated data rate.

7. The method of claim 2 further comprising generating transmit power level and data rate instructions for a transmitting station, the transmit power level and data rate instructions to include the selected modulation and code rate and a selected transmit power level.

8. The method of claim 1 wherein the data rate is further selected based on a mean-variance adaptation that includes a mean channel power gain based on channel gains for each of the subcarriers, a variance of the mean channel power gain, and predicted SNRs for each of the data rates.

9. The method of claim 1 wherein estimating the throughput comprises selecting various data rates for each of the subcarriers of the multicarrier communication channel based on the SNR for the associated subcarrier, and
   wherein estimating the throughput comprises calculating throughputs for the multicarrier communication channel for the various data rates,
   wherein selecting comprises selecting a single data rate for the subcarriers of one or more spatial channels and one or more subchannels of the multicarrier communication channel.

10. A method of selecting a data rate of a multicarrier communication channel, the method comprising:
    calculating signal to noise ratios (SNRs) for subcarriers of the multicarrier communication channel from channel state information and a transmit power level;
    estimating a throughput for each of a plurality of data rates from the SNRs; and
    selecting one of the data rates based on the estimated throughputs by selecting a combination of one of a plurality of modulations and one a plurality of code rates associated with a highest of the estimated throughputs, and
    generating transmit power level and data rate instructions for a transmitting station, the transmit power level and data rate instructions to include the selected modulation and code rate and a selected transmit power level,
    wherein the calculating operation is performed by a receiving station based on a known transmit power level provided by the transmitting station in a current packet, the current packet being a request to send (RTS) packet, wherein the method further comprises:

determining, by the receiving station, the channel state information from channel estimates and noise power estimates performed on the RTS packet; and sending, by the receiving station, the data rate instruction to the transmitting station in a clear-to-sent (CTS) packet, the transmitting station to responsively transmit at least portions of a data packet to the receiving station in accordance with the data rate instruction.

11. A method of selecting a data rate of a multicarrier communication channel, the method comprising:

calculating signal to noise ratios (SNRs) for subcarriers of the multicarrier communication channel from channel state information and a transmit power level;

estimating a throughput for each of a plurality of data rates from the SNRs; and selecting one of the data rates based on the estimated throughputs, wherein the multicarrier communication channel comprises either a standard-throughput channel or a high-throughput communication channel, the standard-throughput channel comprising one subchannel, the high-throughput channel comprising a combination of one or more subchannels and one or more spatial channels associated with each subchannel, wherein calculating the SNRs comprises calculating SNRs for each subcarrier of the one or more subchannels and the one or more spatial channels comprising the multicarrier communication channel from the transmit power level and the channel state information, and wherein the method further comprises generating a data rate instruction for a transmitter, the data rate instruction to include a selected modulation and a selected code rate for the one or more subchannels and the one or more spatial channels comprising the multicarrier communication channel.

12. The method of claim 11 further comprising determining the channel state information, the channel state information including noise power estimates and a channel transfer function for each subcarrier of the one or more spatial channels and the one or more subchannels.

13. The method of claim 11 wherein the high-throughput communication channel comprises one of:

a wideband channel having up to four frequency separated subchannels;

a multiple-input-multiple-output (MIMO) channel comprising a single subchannel having up to four spatial subchannels; and a wideband-MIMO channel comprising two or more frequency separated subchannels, each subchannel having two or more spatial channels.

14. The method of claim 13 wherein the wideband channel has a wideband channel bandwidth of up to 80 MHz and comprises up to four of the subchannels, wherein the subchannels are non-overlapping orthogonal frequency division multiplexed channels, wherein each subchannel has a subchannel bandwidth of approximately 20 MHz and comprises a plurality of orthogonal subcarriers, and wherein the one or more spatial channels are non-orthogonal channels associated with one of the subchannels.

15. The method of claim 11 wherein when the multicarrier communication channel is a high-throughput communication channel, the one or more spatial channels and the one or more subchannels are provided by a corresponding one or more transmit antennas of a transmitting station.

16. The method of claim 11 wherein the subcarriers of an associated subchannel have a null at substantially a center frequency of the other subcarriers to achieve substantial orthogonality between the subcarriers of the associated subchannel.

17. A method of selecting a data rate of a multicarrier communication channel, the method comprising:

calculating signal to noise ratios (SNRs) for subcarriers of the multicarrier communication channel from channel state information and a transmit power level;

estimating a throughput for each of a plurality of data rates from the SNRs; and selecting one of the data rates based on the estimated throughputs by selecting a combination of one of a plurality of modulations and one a plurality of code rates associated with a highest of the estimated throughputs, and wherein the plurality of modulations comprise binary phase shift keying (BPSK), quadrature phase shift keying (QPSK), 8PSK, 16-quadrature amplitude modulation (16-QAM), 32-QAM, 64-QAM, 128-QAM, and 256-QAM, and wherein the plurality of code rates comprise forward error correction (FEC) code rates of ½, ⅔, and ¾.

18. A method of selecting a data rate of a multicarrier communication channel, the method comprising:

calculating signal to noise ratios (SNRs) for subcarriers of the multicarrier communication channel from channel state information and a transmit power level;

estimating a throughput for each of a plurality of data rates from the SNRs;

selecting one of the data rates based on the estimated throughputs; and after calculating the SNRs for each subcarrier of the multicarrier communication channel:

calculating a subcarrier capacity for each of the data rates based on the SNR calculated for an associated one of the subcarriers; and refraining from estimating the throughput for each of the data rates, wherein selecting the data rate comprises selecting one of the data rates of the plurality based on a sum of the subcarrier capacities.

19. The method of claim 18 wherein the subcarrier capacity for each subcarrier is substantially calculated by multiplying a subcarrier frequency spacing by a logarithm of one plus the SNR for the associated subcarrier divided by a predetermined subcarrier SNR gap.

20. The method of claim 18 wherein selecting the data rate comprises:

determining an upper and a lower data rate based on the sum of the subcarrier capabilities;

calculating a first number of subcarriers with capacities higher than the upper data rate;

calculating a second number of subcarriers with capacities lower than the lower data rate; and selecting the upper data rate when a difference between the first and second numbers is greater than a predetermined percentage of the subcarriers comprising the multicarrier communication channel.

21. A communication station comprising:

channel state information processing circuitry to calculate signal to noise ratios (SNRs) for individual subcarriers of a multicarrier communication channel from a transmit power level and channel state information and to calculate a subcarrier capacity for the individual subcarriers based on the SNRs; and data rate selection circuitry to estimate a throughput for each of a plurality of data rates from a sum of the individual subcarrier capacities and a predicted packet error ratio (PER) for each of the data rates, wherein the data rate selection circuitry selects one of the data rates based on the estimated throughputs, wherein for a subsequent transmission, the individual subcarriers are to have a uniform modulation and coding rate based on the selected data rate.

22. The communication station of claim 21 wherein the data rate selection circuitry initially selects one of the data rates from a combination of one of a plurality of modulations and one a plurality of code rates associated with a highest of the estimated throughputs, selects a next higher data rate when a predetermined percentage of the individual subcarriers have capacities greater than the initially selected data rate, and selects a next lower data rate when a predetermined percentage of the individual subcarriers have capacities lower than the initially selected data rate.

23. The communication station of claim 22 wherein the data rate selection circuitry further predicts the packet error ratios (PERs) from the SNRs for each of the data rates and estimates the throughput by estimating a throughput for each of the data rates from the predicted PERs.

24. The communication station of claim 23 wherein the data rate selection circuitry predicts PERs comprises using SNR performance curves for the plurality of data rates to determine a PER for each data rate, the SNR performance curves being predetermined and stored in a memory of a receiving station.

25. The communication station of claim 23 wherein the data rate selection circuitry calculates a bit-error rate (BER), based on a known modulation of a current packet, and determines a PER for each of the plurality of data rates based on a predetermined BER performance of a decoder, the calculated BER, and a length of the current packet.

26. The communication station of claim 23 wherein the data rate selection circuitry estimates a throughput for each data rate of the plurality by multiplying an associated one of the data rates by one minus the PER predicted for the associated data rate.

27. The communication station of claim 22 wherein the data rate selection circuitry generates transmit power level and data rate instructions for a transmitting station, the transmit power level and data rate instructions to include the selected modulation and code rate and a selected transmit power level.

28. The communication station of claim 21 wherein the data rate selection circuitry further selects the data rate based on a mean-variance adaptation that includes a mean channel power gain based on channel gains for each of the subcarriers, a variance of the mean channel power gain, and predicted SNRs for each of the data rates.

29. The communication station of claim 21 wherein the data rate selection circuitry selects various data rates for each of the subcarriers of the multicarrier communication channel based on the SNR for the associated subcarrier, and calculates throughputs for the multicarrier communication channel for the various data rates, the data rate selection circuitry further selects a single data rate for the subcarriers of one or more spatial channels and one or more subchannels of the multicarrier communication channel.

30. A communication station comprising:

channel state information processing circuitry to calculate signal to noise ratios (SNRs) for subcarriers of the multicarrier communication channel from a transmit power level and channel state information; and data rate selection circuitry to estimate a throughput for each of a plurality of data rates from the SNRs, wherein the data rate selection circuitry selects one of the data rates based on the estimated throughputs, wherein the data rate selection circuitry selects one of the data rates from a combination of one of a plurality of modulations and one a plurality of code rates associated with a highest of the estimated throughputs, wherein the data rate selection circuitry generates transmit power level and data rate instructions for a transmitting station, the transmit power level and data rate instructions to include the selected modulation and code rate and a selected transmit power level, wherein the channel state information processing circuitry and the data rate selection circuitry are part of a receiving station, and wherein the data rate selection circuitry calculates the SNRs based on a known transmit power level provided by the transmitting station in a current packet, the current packet being a request to send (RTS) packet, wherein the channel state information processing circuitry determines the channel state information from channel estimates and noise power estimates performed on the RTS packet, and wherein transmitter circuitry of the receiving station sends the data rate instruction to the transmitting station in a clear-to-sent (CTS) packet, the transmitting station to responsively transmit at least portions of a data packet to the receiving station in accordance with the data rate instruction.

31. A communication station comprising:

channel state information processing circuitry to calculate signal to noise ratios (SNRs) for subcarriers of the multicarrier communication channel from a transmit power level and channel state information; and data rate selection circuitry to estimate a throughput for each of a plurality of data rates from the SNRs, wherein the data rate selection circuitry selects one of the data rates based on the estimated throughputs, wherein the multicarrier communication channel comprises either a standard-throughput channel or a high-throughput communication channel, the standard-throughput channel comprising one subchannel, the high-throughput channel comprising a combination of one or more subchannels and one or more spatial channels associated with each subchannel, and wherein calculating the SNRs comprises calculating SNRs for each subcarrier of the one or more subchannels and the one or more spatial channels comprising the multicarrier communication channel from the transmit power level and the channel state information, and wherein the communication station further comprises generating a data rate instruction for a transmitter, the data rate instruction to include a selected modulation and a selected code rate for the one or more subchannels and the one or more spatial channels comprising the multicarrier communication channel.

32. The communication station of claim 31 where the channel state information processing circuitry further determines the channel state information, the channel state information including noise power estimates and a channel transfer function for each subcarrier of the one or more spatial channels and the one or more subchannels.

33. The communication station of claim 31 wherein the high-throughput communication channel comprises one of a wideband channel having up to four frequency separated subchannels, a multiple-input-multiple-output (MIMO) channel comprising a single subchannel having up to four spatial subchannels, and a wideband-MIMO channel comprising two or more frequency separated subchannels, each subchannel having two or more spatial channels.

34. The communication station of claim 33 wherein the wideband channel has a bandwidth of up to 80 MHz and comprises up to four of the subchannels,
wherein the subchannels are orthogonal frequency division multiplexed channels,
wherein each subchannel has a subchannel bandwidth of approximately 20 MHz and comprises a plurality of orthogonal subcarriers, and
wherein the one or more spatial channels are non-orthogonal channels associated with one of the subchannels.

35. The communication station of claim 31 further comprising one or more antennas to communicate over the one or more spatial channels and the one or more subchannels when the multicarrier communication channel is a high-throughput communication channel.

36. The communication station of claim 31 wherein the subcarriers of an associated subchannel have a null at substantially a center frequency of the other subcarriers to achieve substantial orthogonality between the subcarriers of the associated subchannel.

37. A communication station comprising:
channel state information processing circuitry to calculate signal to noise ratios (SNRs) for subcarriers of the multicarrier communication channel from a transmit power level and channel state information; and
data rate selection circuitry to estimate a throughput for each of a plurality of data rates from the SNRs,
wherein the data rate selection circuitry selects one of the data rates based on the estimated throughputs,
wherein the data rate selection circuitry selects one of the data rates from a combination of one of a plurality of modulations and one a plurality of code rates associated with a highest of the estimated throughputs,
wherein the plurality of modulations comprise binary phase shift keying (BPSK), quadrature phase shift keying (QPSK), 8PSK, 16-quadrature amplitude modulation (16-QAM), 32-QAM, 64-QAM, 128-QAM, and 256-QAM, and
wherein the plurality of code rates comprise forward error correction (FEC) code rates of ½, ⅔, and ¾.

38. A communication station comprising:
channel state information processing circuitry to calculate signal to noise ratios (SNRs) for subcarriers of the multicarrier communication channel from a transmit power level and channel state information; and
data rate selection circuitry to estimate a throughput for each of a plurality of data rates from the SNRs,
wherein the data rate selection circuitry selects one of the data rates based on the estimated throughputs,
wherein the data rate selection circuitry calculates a subcarrier capacity for each of the data rates based on the SNR calculated for an associated one of the subcarriers for each subcarrier of the multicarrier communication channel,
the data rate selection circuitry refrains from estimating the throughput for each of the data rates, and the data rate selection circuitry selects one of the data rates of the plurality based on a sum of the subcarrier capacities.

39. The communication station of claim 38 wherein the data rate selection circuitry calculates the subcarrier capacity for each subcarrier substantially by multiplying a subcarrier frequency spacing by a logarithm of one plus the SNR for the associated subcarrier divided by a predetermined subcarrier SNR gap.

40. The communication station of claim 38 wherein the data rate selection circuitry:
determines an upper and a lower data rate based on the sum of the subcarrier capabilities;
calculates a first number of subcarriers with capacities higher than the upper data rate;
calculates a second number of subcarriers with capacities lower than the lower data rate; and
selects the upper data rate when a difference between the first and second numbers is greater than a predetermined percentage of the subcarriers comprising the multicarrier communication channel.

41. A system comprising:
a substantially omnidirectional antenna;
a receiver to receive signals through then antenna through a multicarrier communication channel;
channel state information processing circuitry to calculate signal to noise ratios (SNRs) for individual subcarriers of a multicarrier communication channel from a transmit power level and channel state information and to calculate a subcarrier capacity for the individual subcarriers based on the SNRs; and
data rate selection circuitry to estimate a throughput for each of a plurality of data rates from a sum of the individual subcarrier capacities and a predicted packet error ratio (PER) for each of the data rates,
wherein the data rate selection circuitry selects one of the data rates based on the estimated throughputs,
wherein for a subsequent transmission, the individual subcarriers hare to have a uniform modulation and coding rate based on the selected data rate.

42. The system of claim 41 wherein the data rate selection circuitry initially selects one of the data rates from a combination of one of a plurality of modulations and one a plurality of code rates associated with a highest of the estimated throughputs, selects a next higher data rate when a predetermined percentage of the individual subcarriers have capacities greater than the initially selected data rate, and selects a next lower data rate when a predetermined percentage of the individual subcarriers have capacities lower than the initially selected data rate.

43. The system of claim 42 wherein the data rate selection circuitry further predicts the packet error ratios (PERs) from the SNRs for each of the data rates and estimates the throughput comprises estimating a throughput for each of the data rates from the predicted PERs.

44. A computer-readable medium that stores instructions, which when executed by one or more processors, cause the processors to perform operations comprising:
calculating signal to noise ratios (SNRs) for the individual subcarriers of the multicarrier communication channel from channel state information and a transmit power level;
calculating a subcarrier capacity for the individual subcarriers from the SNRs;
estimating a throughput for the multicarrier communication channel for each of a plurality of data rates from a sum of the individual subcarrier capacities and a predicted packet error ratio (PER) for each of the data rates; and selecting one of the data rates based on the estimated throughputs, wherein for a subsequent transmission, the individual subcarriers are to have a uniform modulation and code rate based on the selected data rate.

45. The computer-readable medium of claim 44 wherein the instructions, when further executed by one or more of the processors cause the processors to perform operations further comprising:

initially selecting one of the data rates based on selecting a combination of one of a plurality of modulations and one a plurality of code rates associated with a highest of the estimated throughputs;

selecting a next higher data rate when a predetermined percentage of the individual subcarriers have capacities greater than the initially selected data rate; and selecting a next lower data rate when a predetermined percentage of the individual subcarriers have capacities lower than the initially selected data rate.

46. The computer-readable medium of claim 45 wherein the instructions, when further executed by one or more of the processors cause the processors to perform operations further comprising predicting the packet error ratios (PERs) from the SNRs for each of the data rates, and wherein estimating the throughput comprises estimating a throughput for each of the data rates from the predicted PERs.

* * * * *